United States Patent Office  
3,355,496  
Patented Nov. 28, 1967

3,355,496
PRODUCTION OF NEOCARBORANE BY CONCURRENT DEALKYLATION AND REARRANGEMENT OF ALKYLCARBORANES
Carl W. Schoenfelder, Livermore, Calif., and Marvin M. Fein, Westfield, N.J., assignors, by mesne assignments, to the United States of America as represented by the United States Atomic Energy Commission
No Drawing. Filed May 18, 1965, Ser. No. 456,821
11 Claims. (Cl. 260—606.5)

This invention relates to a novel and simplified process for preparing neocarborane, a species related to carborane.

More particularly, this invention concerns an improved process of preparing neocarborane by the concurrent dealkylation and rearrangement of alkylcarboranes.

Neocarborane is a new carborane species having an empirical formula identical with carborane ($C_2H_{12}B_{10}$) and similar general properties, but differing substantially in its structure and in certain of its physical and chemical properties. For example, carborane has a carbon to carbon bond which is often represented as:

$$-C\underset{B_{10}H_{10}}{\diagdown\diagup}C-$$

In contrast, neocarborane has only boron to carbon bonds which can probably be represented as:

$$-C-B_{10}H_{10}-C-$$

This difference in bonding between the two species is a substantial factor in their differences in thermal stability and the type of reactions that they undergo. For example, neocarborane has greater thermal and chemical stability than carborane. This is attributable to the greater stability of the boron-carbon bond compared to the carbon to carbon bond. This difference in bonding also manifests itself in the types of polymers the two compounds form. For example, there is a greater tendency of neocarborane and its derivatives to form linear polymers whereas carborane and its derivatives tend to form cyclic products under comparable conditions.

The prefix "neo" as used throughout this application to describe the new species of carborane is used in its connotation of something "new" as is defined in Webster's Third Edition of the New International Dictionary, rather than in the sense of implying a structure of a central carbon atom surrounded by four other carbon atoms as is the case in "neopentane" [$(CH_3)_4C$].

Other differences between neocarborane and carborane are their melting points and their infrared absorption spectra. For example, neocarborane is lower melting and has a significantly different absorption spectra. A more exhaustive discussion of the physical and chemical characteristics as well as its infrared absorption spectra appears in copending Ser. No. 97,098 filed Mar. 20, 1961.

As indicated above, neocarborane is a valuable polymer intermediate and is useful in the preparation of thermally stable polymers. Because of this valuable utility, there is currently a need for large quantities of neocarborane.

Unfortunately the present method of preparing the isomer requires five (5) separate steps, and overall yields based upon the starting material decaborane are less than 40%. The prior art process is summarized below. The numbers which appear in the parentheses at the right of each equation, represent the material balance obtained in a typical preparation.

(1) Decaborane (1362 g.) +acetonitrile→bis-(acetonitrilo) decaborane (1300 g.)
(2) Bis-(acetonitrilo) decaborane+1,4-diacetoxy-2-butyne→bis-(acetoxymethyl) carborane (1438 g.)

(3) Bis-(acetoxymethyl) carborane $\xrightarrow[HCl]{CH_3OH}$ bis-(hydroxymethyl) carborane (908 g.)

(4) Bis-(hydroxymethyl) carborane $\xrightarrow[H_2O]{KMnO_4}$ carborane (481 g.)

(5) Carborane→neocarborane (481 g.)

As the above series of reactions indicate, while the final step of converting carborane to neocarborane is direct and gives quantitative yields, the carborane precursor is tedious to prepare and the overall yields (under 40%) are poor. There is a need for a process which requires fewer steps to get to the neocarborane precursor. Ideally, an improved process would bypass the preparation of carborane which is difficult to prepare and would involve fewer steps to get to the neocarborane precursor. Hopefully, these advantages would produce neocarborane in substantially better yields than is now obtainable in the prior art, in an equally high state of purity.

Thus, it is an object of this invention to prepare neocarborane in better overall yields than can be obtained with the process of the prior art.

It is a further object of this invention to prepare neocarborane without the need for preparing carborane as a process intermediate.

Yet an additional object of this invention is to provide an alternative process for preparing neocarborane.

It is yet a further object of this invention to provide a more simplified and economical synthesis for preparing neocarborane requiring fewer process steps and less manipulations than is required with the process of the prior art.

Further objects of this invention will suggest themselves from a further perusal of this application.

The above objects among others have been achieved through the development of a novel concurrent one-step dealkylation and rearrangement of alkylcarboranes having at least 3 carbon atoms, to neocarborane. The alkylcarboranes can be made in good yield from decaborane, a starting material common to the prior art process. A preferred means of proceeding to the neocarborane precursor appears below.

(1) $B_{10}H_{14} + R-C\equiv CH \xrightarrow{\text{Lewis Base}} R-C\underset{B_{10}H_{10}}{\diagdown\diagup}CH$ (2) $R-C\underset{B_{10}H_{10}}{\diagdown\diagup}CH \xrightarrow{\Delta}$ Neocarborane + waste gases wherein R is an alkyl group having at least 3 carbon atoms, straight chain or branched chain. Typical alkylcarboranes include propyl and isopropylcarborane, the butyl carboranes, the pentyl carboranes, the hexyl carboranes, the octyl carboranes and the like.

A required preliminary step to the inventive process is the preparation of the neocarborane precursor, the alkylcarborane. Two routes among several others are disclosed.

In the preferred variation shown in the first of the two reactions shown above, decaborane is reacted with an alkylacetylene having a terminal acetylenic group. An alternative procedure is to react decaborane with an alkenylacetylene to form the alkenylcarborane and then to reduce the double bond to form the alkylcarborane reactant. The second procedure is not favored since its requires an additional step, the reduction of the alkenyl group. However, since some of the alkenylacetylenes are commercially available products the alkenylacetylenes are sometimes more conveniently utilized starting materials than the alkylacetylenes.

In either process for preparing the alkylcarborane, the decaboranes, and the alkyl-(or alkenyl) acetylene are heated in the presence of an inert solvent-Lewis base mixture or a Lewis base alone at a temperature range of 50–130° C. for a period of time ranging from 4–24 hours. The inert solvents used in the process can be of aliphatic, aromatic or cyclic structure. Especially preferred are those inert solvents boiling between 50–130° C. Satisfactory inert solvents include among others: the pentanes, hexanes, heptanes, benzene, toluene, xylene, cyclohexane and the like. Among the Lewis bases which can be used in the reaction mixture are the aliphatic nitriles and sulfides. Specific examples of these are acetonitrile, propionitrile, dimethyl sulfide and diethyl sulfide. Ordinarily the reaction is conducted at atmospheric pressures. However, where lower alkenyl-or lower alkylacetylenes such as the methyl and ethylacetylenes are used as reactants their volatility requires the use of a pressurized reaction vessel. A convenient means of accomplishing this is through the use of an autoclave, pressure bomb or sealed tube. When an alkenyl acetylene is used as a co-reactant with the decaborane, the double bond of the alkenyl group is reduced after the initial reaction with the decaborane is complete, using hydrogenation proceduers and catalysts known to the art. Typical hydrogenation catalysts are Raney nickel or palladium or platinum suspended or deposited on an inert support or matrix. Satisfactory supports are the finely particulated carbons such as carbon black, finely divided clay, silica or any other support having a high surface area. The decaborane reactant used to prepare the preferred alkylcarboranes starting materials of this invention, is prepared by the hydrolysis of diborane. This procedure is described in the technical literature including Chemical Abstracts.

The novel concurrent rearrangement and dealkylation of the inventive process is carried out by the extended heating of an alkylcarborane having at least 3 carbon atoms in the alkyl group, under superatmospheric pressure, between 450–650° C. until a substantial quantity of necarborane product is formed. The neocarborane product contained therein is isolated by the usual separation procedures such as solvent extraction or recrystallization.

While traces of the neocarborane can be obtained beween 300–400° C., the predominant products produced between these temperatures are the alkylneocarboranes corresponding to the alkylcarborane starting materials. However, the yield af neocarborane becomes substantially quantitative under certain conditions. The most important of these conditions are the length of the alkyl chain of the alkylcarborane starting material, the temperature under which the conversion is carried out and to a lesser extent the length of the heating time. The role of these factors is as follows:

*Role of alkyl chain length.*—The most resistant carboranes to rearrangement to neocarborane are methylcarborane and ethylcarborane. When these alkylcarboranes are heated to 350–450° C. in a pressurized system, quantitative conversion to methylneocarborane or ethylneocarborane takes place after some 24 hours. While the rearrangement to alkylneocarborane readily took place under these conditions, no concurrent dealkyllation to the neocarborane is observed. However, when isopropylcarborane or higher alkylcarboranes are heated under these same conditions of superatmospheric pressures, but higher temperatures, concurrent rearrangement and dealkylation to neocarborane readily takes place. The fact that a different reaction takes place resulting in a different product solely because the alkylcarborane reactant increases from 1 or 2 to 3 carbon atoms is both surprising and unexpected. This criticality of reactant chain length coupled with the critical temperature range and the critical reaction time, is the essence of the inventive concept.

*Role of temperature.*—As indicated earlier, while traces of the neocarborane may be produced as reaction product intermediates or degradates at lower temperatures, it has been established the concurrent rearrangement and dealkylation to neocarborane takes place above 450° C., preferably between about 500° C., to the decomposition temperature of neocarborane. The latter temperature is believed to be somewhat below about 650° C. under the high pressure obtained in the reactor.

*Role of time.*—The reaction time is a factor in the quantitative preparation of neocarborane by the inventive process. Unfortunately, the reaction time necessary for the preparation of quantitative yields of neocarborane can not be stated with precision, since it is dependent upon the alkylcarborane used as the starting material and the pyrolysis temperature. However, little or no concurrent dealkylation and rearrangement appears to take place before 24 hours under so-called average reaction conditions (350–450° C.), with the majority of runs requiring between 48 to 96 hours. Reaction times in excess of 120 hours do not appear to be harmful and no apparent advantage has been observed in exceeding these times, and for these reasons, 48 hours or over represents the operable time range with 48–120 hours being preferred. At lower temperatures, the reaction time is proportionally extended.

As indicated, under the conditions of extended pyrolysis at high (above 450° C.) temperature and high pressures, the alkylcarborane reactants rearrange and dealkylate to form quantities of the desired neocarborane product. For example, the propyl-, the butyl-, the amyl, the hexyl-, the heptyl-, and the octyl- and higher alkylcarboranes among others undergo the concurrent rearrangement and dealkylation and are satisfactory reactants. However, because of the difficulty in preparing the higher alkylcarboranes and the recalcitrance of the methyl and ethylcarborane, the preferred reactants are the alkylcarboranes where the alkyl radical contains at least 3 carbon atoms up to and including 8 carbon atoms. These alkyl radicals can be straight chain or branched chain, joined or conjoined.

A convenient means of performing the inventive heating step is through the use of a pressure tube, bomb, or autoclave reactor. In practice, the alkylcarborane prepared as described above, or by an alternative process, is placed into a reaction vessel and sealed off prior to heating. The heating is a conducted period of at least 24 hours to 120 hours or more, preferably in an inert atmosphere. As indicated, the greater the reaction time, the greater the tendency of the more thermodynamically stable neocarborane isomer to be formed in substantial quantitative yield. However, no appreciable difference in yield has been observed after 120–240 hours or more when the preferred temperature range of above 400° C. is used. The inert atmosphere which, while not essential to operability, minimizes atmospheric contamination during the reaction. The inert atmosphere can be supplied by the use of gaseous nitrogen, argon, helium, and the like.

After the heating period is over, the pressurized reaction vessel is vented, and the solid residue neocarborane product recovered. If desired, the neocarborane can be further purified by recrystallization from various solvents or solvent mixtures. A satisfactory solvent mixture for this purpose is a butanol-hexane system.

To indicate the workings of the inventive process, the following illustrative embodiments are submitted.

In one illustrative embodiment, neocarborane is prepared by the pyrolysis of hexylcarborane in a closed system.

(A) *Preparation of hexylcarborane*

A one-liter, three-necked flask, equipped with a stirrer and reflux condenser is charged with 25 g. of bis(acetonitrilo)decaborane, 500 ml. of benzene and 14.1 g. of 1-octyne. The mixture is agitated and brought to reflux and maintained at temperature for 12 hours. The mixture is allowed to cool, filtered and the filtrate stripped off to remove solvent. An oily residue remains, which is extracted with petroleum ether. The petroleum ether extract is stripped off and the residue purified by distillation at 130° C./0.5 mm. to yield hexylcarborane.

(B) *Conversion of n-hexylcarborane to neocarborane*

A 50 parts by weight portion of hexylcarborane prepared above is sealed into an autoclave equipped with a means of heating, cooling and pressure release valve as described above. The autoclave is heated to about 480–550° C. for 30 hours. At the end of this time, the heating is discontinued and the autoclave is vented off. An 85% yield of neocarborane product based upon the weight of decaborane starting material is obtained. The melting point and absorption spectra established the product as neocarborane.

In a further embodiment of the inventive process, neocarborane is prepared from n-butylcarborane as follows:

(A) *Preparation of 1-n-butylcarborane*

A one-liter, three-necked flask, equipped with a stirrer and reflux condenser is charged with 25 g. of bis(acetonitrilo)decaborane, 500 ml. of benzene and 12.8 g. of 1-hexyne. The mixture is agitated and brought to reflux and maintained at temperature for 14 hours. The mixture is allowed to cool, filtered and the filtrate stripped off to remove solvent. An oily residue remained, which is extracted with petroleum ether. The petroleum ether extract is stripped off and the residue purified by distillation at 130° C./10 mm. to yield butylcarborane.

(B) *Conversion of 1-n-butylcarborane to neocarborane*

A 50 parts by weight portion of 1-butylcarborane prepared above is sealed into an autoclave equipped as described in the previous embodiment. The autoclave is heated to about 500–525° C. for 30 hours. At the end of this time, the heating is discontinued and the autoclave is vented off. A yield of over 80% neocarborane product is obtained. This is based upon the weight of decaborane starting material. The melting point and absorption spectra established the product as neocarborane.

In another related embodiment, n-octylcarborane is converted to neocarborane as described below:

(A) *Preparation of n-octylcarborane*

A two-liter autoclave, equipped with heating, cooling and stirring means is charged with 35 g. of bis(acetonitrilo)decaborane, 500 ml. of benzene and 17.2 g. of 1-decyne. The mixture is agitated and brought to reflux and maintained at the reflux temperature for 14 hours. The mixture is allowed to cool, filtered and the filtrate stripped off to remove solvent. The oily residue which remains is extracted twice with petroleum ether. The petroleum ether in the combined extracts is stripped off and the residue purified by distillation at 125° C./0.5 mm. The solid product is the n-octylcarborane.

(B) *Conversion of n-octylcarborane to neocarborane*

A 200 parts by weight portion of octylcarborane prepared above is sealed into an autoclave equipped as previously described. The autoclave is heated to about 450° C. for 50 hours. At the end of this time the heating is discontinued and the autoclave is vented and the neocarborane recovered. An 80% yield of neocarborane product based upon the weight of decaborane starting material is obtained. The melting point and absorption spectra established the product as neocarborane.

As the previous description indicates, several advantages become available with the use of the novel synthetic process which is unavailable with the prior art process.

A primary advantage of the novel process is a doubling of the overall yield of the process calculated on the basis of the common starting material in both processes, decaborane. The decaborane is an essential starting material in any neocarborane process since it is the source of the carborane group. While it is true that the conversion of carborane to neocarborane product is quantitative, to assess any neocarborane process practically, the availability and cost of producing the reactants must be considered. In the prior art process the preparation of the carborane is a necessary step. The prior art synthesis of carborane is a tedious process which requires 4 separate steps in which the yields are poor. For this reason a process such as the present one which bypasses the preparation of carborane and gives upwards of 60% yield of product based upon decaborane starting material is clearly advantageous. An ancillary advantage of the novel process is that fewer process steps are involved. Since there is less handling of hazardous materials, the process is safer and labor costs and process time are correspondingly reduced.

A final and not inconsiderable advantage of this invention is that it offers an alternative means for preparing neocarborane. As indicated previously, neocarborane's thermodynamic stability and its value as a potential polymer intermediate, make it desirable to have more than one method of producing it. Thus, the instant process gives greater flexibility to any program for preparing neocarborane in commercial quantities.

The process steps leading up to the preparation of the alkyl-carborane are flexible in several respects such as in the choice of reactants, the use of solvents and the choice of reaction conditions. For example, any alkyl acetylene having the acetylenic grouping in the terminal position can be used as the co-reactant with decaborane. The alkylacetylene are favored reactants because they directly yield the desired alkylcarborane without the need for hydrogenating the double bonds as when the alkenylacetylenes are used as reactants. In addition, the overall yields are improved and a minimum number of steps (2) are required. As indicated supra, when the alkenylacetylenes are used as reactants with the decaborane, the alkenyl group is usually hydrogenated prior to the preparative pyrolysis step. The hydrogenation can be accomplished using any of the standard reduction procedures well known to the art. For example, Raney nickel, platinum or palladium on carbon, clay or silica can be used to hydrogenate the double bond in the alkenyl group. To more fully demonstrate the workings of the inventive process when the preferred reactant isopropylcarborane is used, a detailed example is submitted.

EXAMPE 1.—PREPARATION OF NEOCARBORANE FROM 1-ISOPROPYLCARBORANE (A) *Preparation of 1-isopropylcarborane*

A one-liter, three-necked flask, fitted with a Dry-Ice reflux condenser, thermometer and agitator, is charged with 86 g. of isopropenylacetylene, 100 g. of decaborane, 168 g. of acetonitrile and 217 g. of toluene. The contents are vigorously stirred and the flask is heated and maintained at a temperature of about 65–70° C. (reflux) for 24 hours; at this time, the solvents are stripped off at 80° C./760 mm. and finally at 95° C./15 mm. The contents of the flask are then slowly added to 332 g. of pentane with rapid agitation at which point solids precipitated. The solids are removed by filtration, washed with pentane and the washings combined with the filtrate. The filtrate is washed with 10% by weight solution of caustic in water, then with water until neutral. The pentane solution is dried by slurrying with anhydrous calcium sulfate and the pentane removed by distillation. The residue, crude isopropenylcarborane, is isolated by rectification at 95–100° C./4 mm. The isopropenylcarborane is subsequently reduced to isopropylcarborane using a nickel catalyst and 50 pounds hydrogen pressure.

(B) *Conversion of 1-isopropylcarborane to neocarborane*

A 184 parts by weight portion of isopropylcarborane prepared in Example 1 is sealed into an autoclave equipped with a pressure gauge under an atmosphere of dry nitrogen gas. The autoclave is then heated to about 450° C. for 44 hours. At the end of this time, the heating is discontinued and the autoclave is vented off to a condenser immersed in a Dry-Ice acetone bath.

More than 90% yield based upon the weight isopropylcarborane is obtained, the yield based on decaborane is about 65%. The product melted at 265° C., some 20° C. lower than carborane. The infrared absorption spectra further distinguished between the carborane and neocarborane and confirmed the products identity. Analysis of the vented waste gases showed the presence of variable quantities of hydrogen, methane, ethane, ethylene, propane, and propylene.

As noted earlier, the inventive process is capable of modifications and changes insofar as reactants, reaction temperatures, reaction pressures and reaction times are concerned. The invention is best defined by the claims which follow.

We claim:

1. The process of preparing neocarborane by the concurrent dealkylation and rearrangement of alkylcarboranes having at least 3 carbon atoms in the alkyl radical, at a temperature greater than 450° C., above atmospheric pressure, until said neocarborane product is formed and isolating said product therein.

2. The process of claim 1 wherein the alkylcarborane is 1-n-propylcarborane.

3. The process of claim 1 wherein the alkylcarboane is 1-isopropylcarborane.

4. The process of claim 1 wherein the alkylcarborane is 1-butylcarborane.

5. The process of claim 1 wherein the alkylcarborane is 1-pentylcarborane.

6. The process of claim 1 wherein the alkylcarborane is 1-hexylcarborane.

7. The process of claim 1 wherein the alkylcarborane is 1-heptylcarborane.

8. The process of claim 1 wherein the alkylcarborane is 1-octylcarborane.

9. The process of claim 1 wherein the alkylcarborane is heated in an inert atmosphere.

10. The process of preparing neocarborane by the concurrent dealkylation and rearrangement of an alkylcarborane at a temperature range between about 450–550° C. in an inert gas atmosphere, above atmospheric pressures, said alkylcarborane having from 3–8 carbon atoms, for at least 48 hours, until neocarborane is formed and isolating said neocarborane contained therein.

11. The process of preparing neocarborane by the concurrent dealkylation and rearrangement of isopropylcarborane at a temperature range between about 450–550° C. C., in an inert gas atmosphere, above atmospheric pressure, for at least 48 hours, until neocarborane is formed and isolating said neocarborane contained therein.

References Cited

Grafstein et al., "Inorganic Chemistry," vol. 2, pp. 1128 to 1133.

TOBIAS E. LEVOW, *Primary Examiner.*

W. F. W. BELLAMY, *Assistant Examiner.*